(12) United States Patent
Keller

(10) Patent No.: US 6,847,316 B1
(45) Date of Patent: Jan. 25, 2005

(54) SELF-CONTAINED, ON-BOARD, CAN-TO-FIELDBUS CONVERTER AND METHOD OF USING THE SAME

(75) Inventor: Jesse Peter Keller, San Diego, CA (US)

(73) Assignee: ISE Corporation, San Diego, CA (US)

( * ) Notice: Subject to any disclaimer, the term of this patent is extended or adjusted under 35 U.S.C. 154(b) by 0 days.

(21) Appl. No.: 10/698,296

(22) Filed: Oct. 31, 2003

(51) Int. Cl.$^7$ .............................................. H03M 7/00
(52) U.S. Cl. ...................................................... 341/106
(58) Field of Search ............................ 341/50, 51, 106

(56) References Cited

U.S. PATENT DOCUMENTS 5,835,030 A * 11/1998 Tsutsui et al. ................ 341/51

* cited by examiner

Primary Examiner—Brian Young

(74) Attorney, Agent, or Firm—Stephen C. Beuerle; Procopio Cory Hargreaves & Savitch

(57) ABSTRACT

A method of communicating a message between an automotive device of an automotive control area network and a non-automotive, industrial device of a non-automotive, fieldbus network includes receiving a message of a source format from one of the automotive device of the automotive control area network and the non-automotive, industrial device of the non-automotive, fieldbus network; translating the message of the source format to a common language format; processing the message of a common language format via a set of stored, configurable rules; translating the processed message of a common language format to a destination message format; and delivering the message in the appropriate destination format to one of the automotive device and the non-automotive, industrial device.

19 Claims, 4 Drawing Sheets

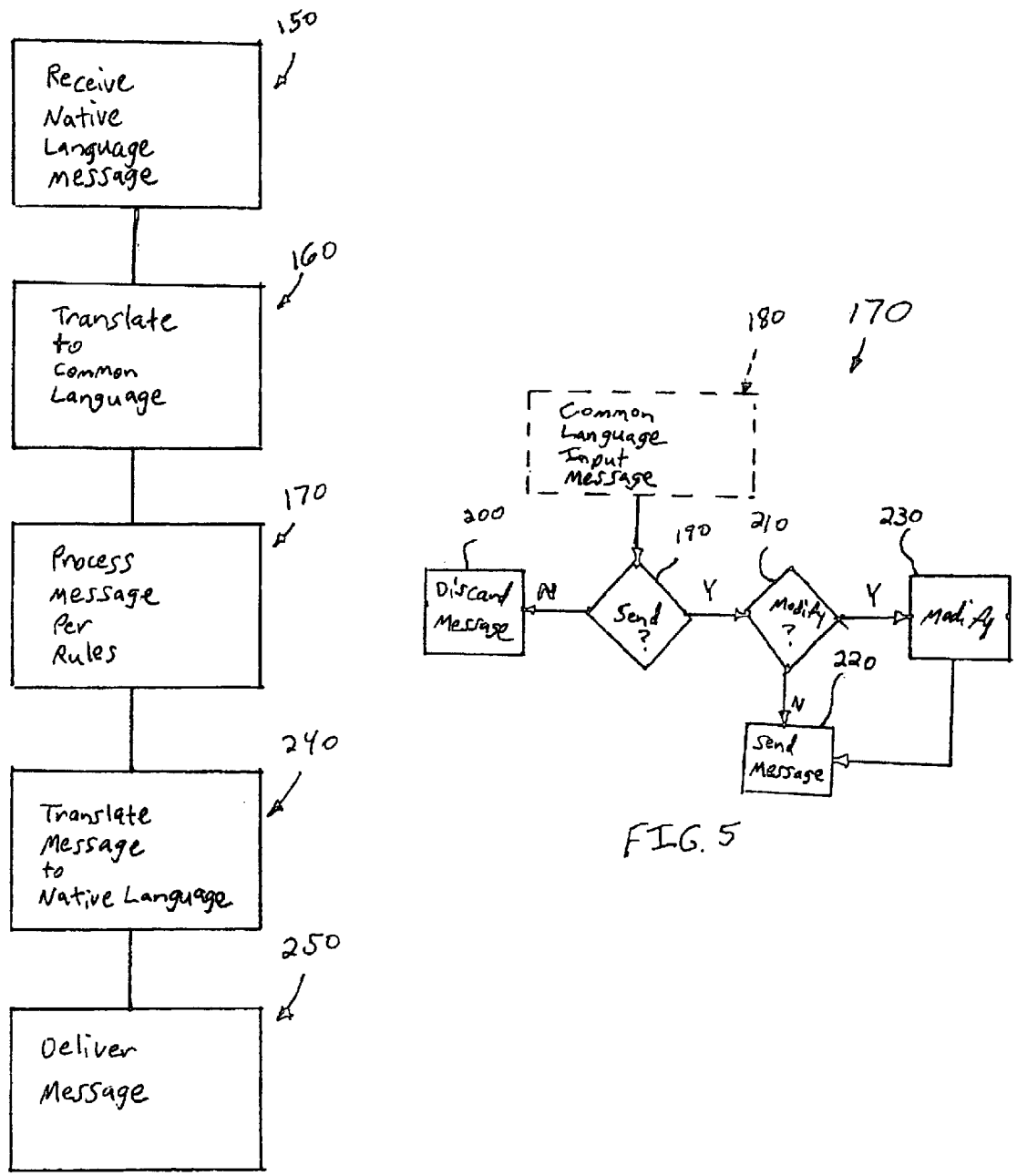

SELF-CONTAINED, ON-BOARD, CAN-TO-FIELDBUS CONVERTER AND METHOD OF USING THE SAME

FIELD OF THE INVENTION

The field of the invention relates to systems and methods for use on heavy-duty surface vehicles to interface on-board computers and control area networks ("CANs") to industrial devices, components, and subsystems not specifically designed for use on vehicles.

BACKGROUND OF THE INVENTION

Many modern heavy-duty vehicles include on-board computers interconnected with high-speed data links. The dashboard, engine, and transmission may each have a specialized computer, all sharing the same communications protocol. Because each device, component, and subsystem is specifically built to function as part of an integrated vehicle system, all the control and status-reporting data communications interfaces are originally designed to be compatible with a vehicle CAN standard.

Recently, there is a trend toward running high-powered accessories (e.g., air conditioning, steering, and braking) electrically using industrial automation components not specifically designed for vehicle use.

A problem with industrial automation components is that they do not communicate with the preexisting vehicle computer networks.

SUMMARY OF THE INVENTION

Accordingly, an aspect of the invention involves a method of communicating a message between an automotive device of an automotive control area network and a non-automotive, industrial device of a non-automotive, fieldbus network. For the purposes of this invention, a fieldbus network is defined to be any data communications network specified by hardware and software protocols with formats native to the industrial device that are different from the protocols that specify the automotive control area network. The method includes receiving a message of a native format from either one of the automotive devices of the automotive control area network or one of the non-automotive, industrial devices of the non-automotive, fieldbus network; translating the original native message format to a common language format; processing the message of a common language format via a set of stored, configurable rules; translating the processed message of a common language format to the appropriate destination native message format; and delivering the message of destination native format to the desired automotive device or non-automotive, industrial device.

BRIEF DESCRIPTION OF THE DRAWINGS

The accompanying drawings, which are incorporated in and form a part of this specification, illustrate embodiments of the invention and together with the description, serve to explain the principles of this invention.

FIG. 4 is a flow chart illustrating an exemplary process for communicating messages between an automotive module and a fieldbus module illustrated in FIGS. 2 and 3.

FIG. 5 is a flow chart illustrating in more detail exemplary logic for processing a message within the common language format illustrated in FIG. 4.

DETAILED DESCRIPTION OF PREFERRED EMBODIMENTS

Figure 1:
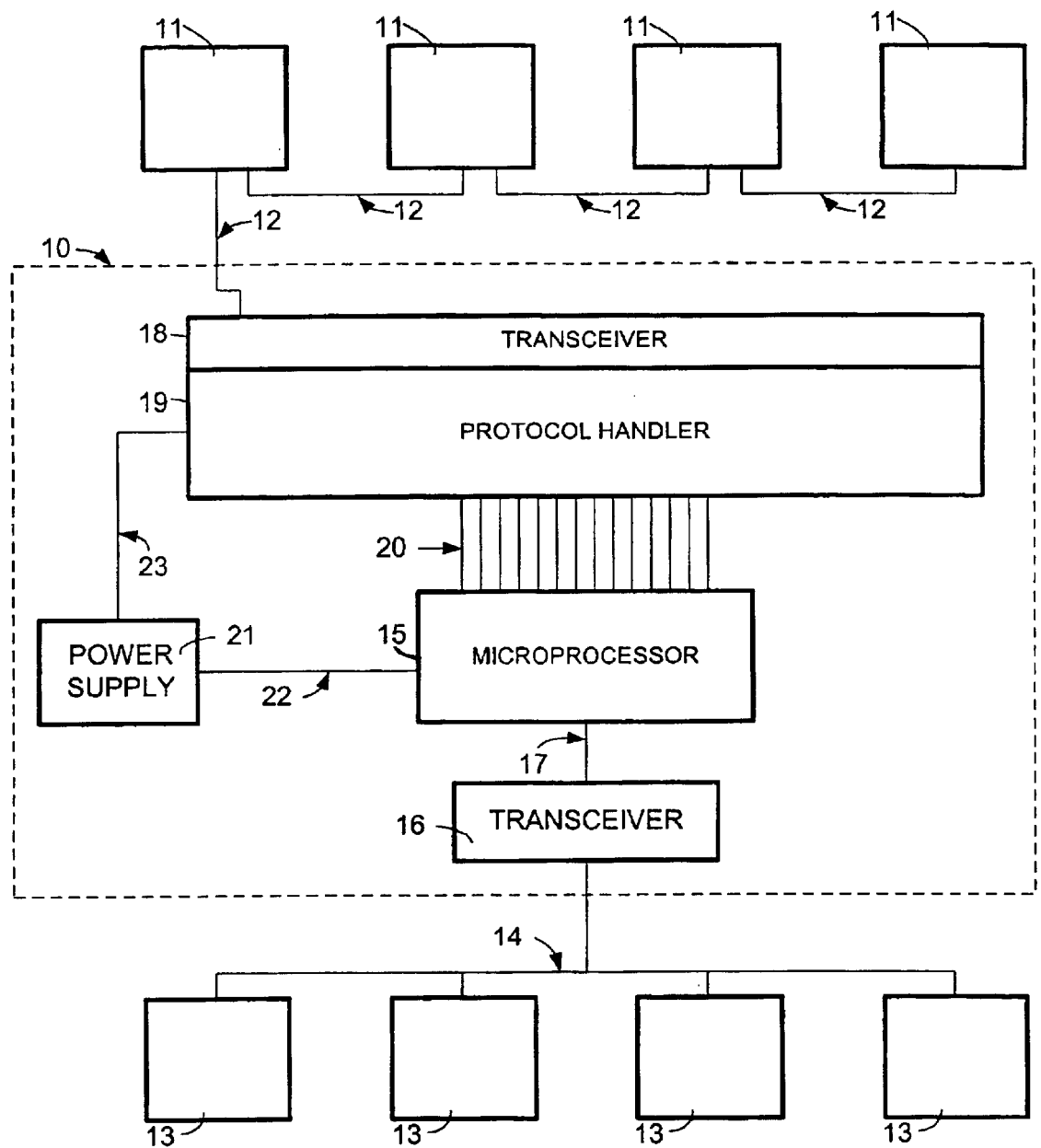
FIG. 1 is a block diagram depicting an embodiment of a self-contained, on-board, CAN-to-fieldbus converter for accommodating the communication of industrial devices of a fieldbus network with automotive devices of a CAN of a vehicle.

With reference to FIG. 1, an embodiment of a self-contained, on-board, CAN-to-fieldbus converter ("converter") 10 for communicating non-automotive, industrial automation devices or components ("industrial devices") 11 on a fieldbus network 12 (any of a number of industrial network protocols available) and automotive computers or devices ("automotive devices") 13 on a control area network ("CAN") 14 is shown. The converter 10 includes a CAN-capable microprocessor 15, a vehicle network transceiver 16, and a combination industrial network transceiver 18 and protocol handler 19. The transceiver 16 may be connected to the microprocessor 15 via a serial bus 17 and the protocol handler 19 may be connected to the microprocessor 15 via a parallel bus 20. Each of these components will be described in turn below.

Industrial Devices

In regard to the industrial devices 11, exemplary industrial devices 11 include, but not by way of limitation, an entire electrically powered air conditioning system including: refrigerant compressor pump, fans, blowers, valves, and sensors; air compressors; hydraulic pumps; vacuum pumps; electric motors; audio systems; video systems; and various temperature, pressure, and position sensors.

Fieldbus Network

The fieldbus network 12 is defined to be any data communications network specified by hardware and software protocols with formats native to the industrial device that are different from the protocols that specify the automotive control area network. Exemplary fieldbus networks 12 include, but not by way of limitation, Mod bus, Profy bus, RS-45, Device Net, and various proprietary buses or networks. A fieldbus network 12 may also include another automotive network as defined by various SAE standards.

Automotive Devices

In regard to the automotive devices 13, exemplary automotive devices 13 include, but not by way of limitation, engine, transmission, ABS brake system, steering system, automotive mechanically powered HVAC system, entry/exit door systems, remote control multiplex systems, power take off systems, trailer monitoring systems, interior and exterior lighting systems, sign display systems, and dash board display systems.

Vehicle Network Transceiver

The vehicle network transceiver 16 may connect into or on an electronic data bus network that satisfies the network hardware and/or software protocols (interface specifications) and can send and receive the electronic signals that represent messages.

Industrial Network Transceiver

The industrial network transceiver 18 serves a similar function to the vehicle network transceiver 16, but for the industrial network.

Protocol Handler

The protocol handler 19 is the logical processing of standard message identification, source, destination, and synchronization formats to extract the specific content of the message.

CAN-Capable Microprocessor

Figure 2:
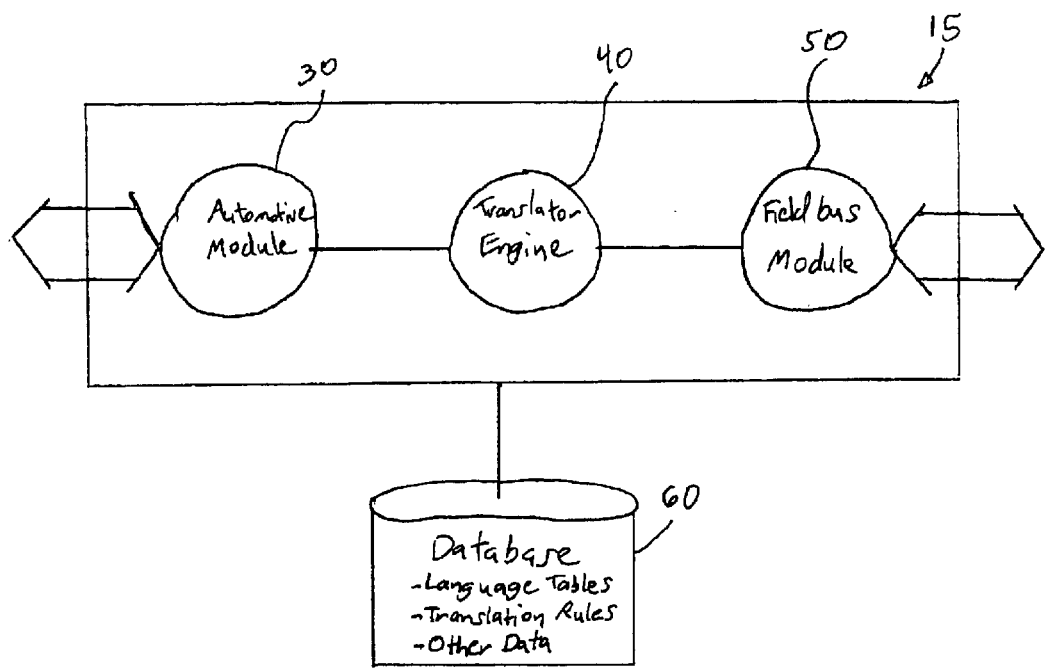
FIG. 2 is a diagram of the logical connection embodiment of a microprocessor and a database of the self-contained, on-board, CAN-to-fieldbus converter.

An exemplary CAN-capable microprocessor 15 includes a computer circuit board with a data network interface that satisfies the hardware and software protocols of SAE standard J-1939. With reference to FIG. 2, the microprocessor 15 may include an automotive module 30, a translator engine 40, and a fieldbus module 50. A database 60 may be coupled to the microprocessor 15 and include language tables, translation tables or rules, and other data. The language tables, translation tables or rules, and/or other data may be added to the database 60 during manufacture or may later be transferred to the database 60 from the fieldbus network 12 and/or the CAN 14.

Figures 3A, 3B:
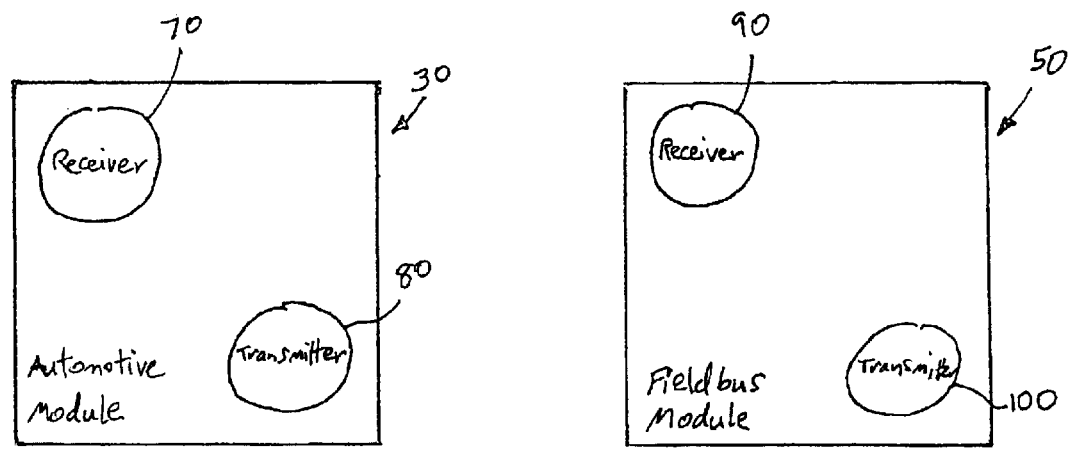
FIGS. 3A, 3B, and 3C are diagrams that represent the functional components of embodiments of an automotive module, a fieldbus module, and a translator, respectively, of the microprocessor of FIG. 2.

With reference to FIG. 3A, the automotive module 30 may include a receiver 70 that receives incoming messages from the transceiver 16 and a transmitter 80 for transmitting messages to the transceiver 16. The automotive module 30 communicates with the translator engine 40 in a manner to be described below. The automotive module 30 is the hardware/software interface to the automotive CAN 14 that satisfies the hardware protocol specification. It may or may not incorporate any of the message protocol format coding and decoding.

With reference to FIG. 3B, the fieldbus module 50 may include a receiver 90 that receives incoming messages from the transceiver 18/protocol handler 19 and a transmitter 100 for transmitting messages to the transceiver 18/protocol handler 19. The fieldbus module 50 communicates with the translator engine 40. Similar to the automotive module 30, the fieldbus module 50 is the hardware/software interface to the fieldbus network 12 that satisfies the hardware protocol specification. It may or may not incorporate any of the message protocol format coding and decoding.

Figure 3C:
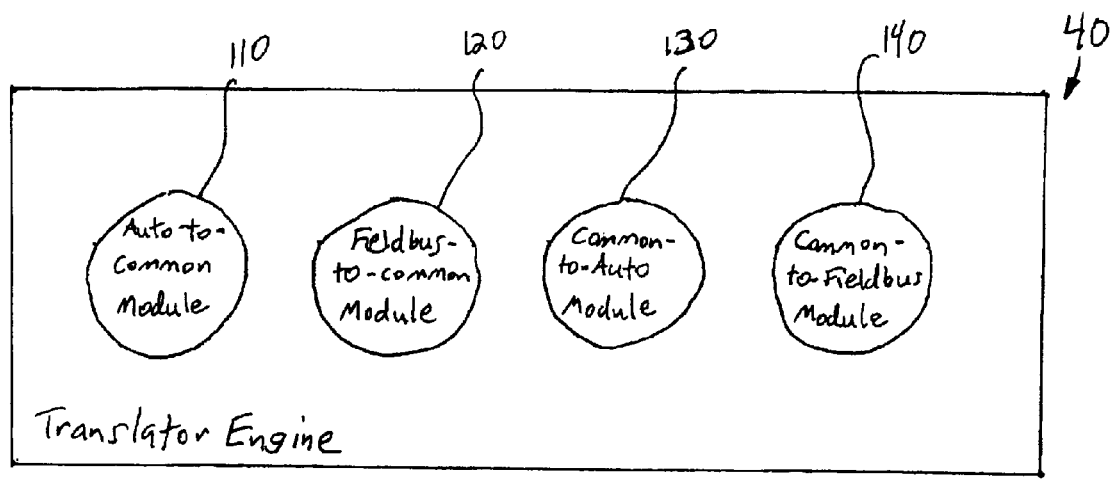

With reference to FIG. 3C, the translator engine 40 may include an auto (CAN bus)-to-common language module 110, a fieldbus-to-common language module 120, a common language to auto (CAN bus) module 130, and a common language to fieldbus module 140 for translating incoming messages to a correct format for further processing or for delivery to the automotive devices 13 or industrial devices 11. These can be implemented, for example, but not by way of limitation, with logical algorithms or lookup tables.

An exemplary method for communicating between the automotive devices 13 on the control area network (CAN) 14 and the industrial devices 11 on the fieldbus network 12 using the converter 10 will now be described. Messages from the automotive devices 13 are received by the transceiver 16 via the CAN 14. The transceiver 16 converts the signals from the automotive signaling voltages of the messages to microprocessor-compatible levels. The messages are sent via a serial bus 17 to the microprocessor 15 for interpretation of these messages. As will be described in more detail below with respect to FIGS. 4 and 5, depending on the content of the message, it is either discarded or processed and sent via a parallel bus 20 to the industrial protocol handler 19 for interpretation. After interpreting the data, the protocol handler 19 transmits the data via an integrated transceiver 18 to the industrial devices 11. The protocol handler 19 properly formats the message according to the requirements of the fieldbus standard specification. The logic of the protocol handler 19 may be implemented by a microprocessor software module, but for many standard networks this is performed in a separate integrated circuit. Whether its implemented in the software of the microprocessor or a separate device, a unique protocol handler may be provided for each different fieldbus.

For messages going in the opposite direction, namely, from the industrial devices 11 to the automotive devices 13, the protocol handler 19 strips off the extra and/or redundant message formatting information to extract the basic message for transmission to the fieldbus-to-common language translator.

By separating the protocol handler 19 from the microprocessor 15, any number of different networks 12 can be supported merely by replacing the protocol handler 19 with a protocol handler 19 specific to the networks 12.

Power consumption of the protocol handler 19 is high compared to the other elements. Accordingly, the converter 10 may include a microprocessor-controlled power supply 21 for the protocol handler 19. When the microprocessor 15 decides that the protocol 19 is not needed (e.g., when the vehicle key is off), the microprocessor 15 may turn the protocol handler 19 off by toggling a control line 22 to a power supply 21. When the output of the power supply 21 is turned off, power no longer flows via power supply line 23 to the protocol handler 19. Depending on the microprocessor 15, information on the parallel data bus 20 may also be interrupted at this time.

The self-contained, on-board, CAN-to-fieldbus converter 10 may be contained inside a waterproof enclosure and impervious to the heat and vibration inherent in the automotive environment. Connectors from the converter 10 to electrical elements outside of the enclosure are preferably waterproof.

With reference to FIGS. 4 and 5, the microprocessor 15 may be programmed with software that interprets data and passes information between the automotive module 30 and the fieldbus module 50. An exemplary method 145 of communicating messages between the automotive module 30 and the fieldbus module 50 will now be described.

At step 150, automotive messages are received in the automotive CAN format by the automotive receiver 70 of the automotive module 30. At step 160, the automotive messages are translated into messages of a common format with the auto-to-common module 110 of the translator engine 40. During this step, the automotive messages are passed through and translated using a table of the database 60.

Similarly, fieldbus messages are received by the fieldbus receiver 90 of the fieldbus module 50 and are translated into messages of a common format with the fieldbus-to-common module 120 of the translator engine 40 using a different table of the database 60.

At step or process 170, messages between the automotive module 30 and the fieldbus module 50 are processed according to one or more rules in the database 60.

With reference to FIG. 5, the process 170 for processing messages between the automotive module 30 and the fieldbus module 50 will be described in more detail. The one or more rules in the database 60 contain instructions on which messages to send or retransmit, which messages to discard, and which messages to modify (e.g., scale, consolidate). At step 180, common language input messages are received for processing. The one or more rules in the database 60 determine at step 190 whether to send or discard the messages. If the one or more rules determine the messages are not relevant, control is passed on to step 200, where the messages are discarded. If the one or more rules determine to send the messages on for possible modification, the messages are passed on to step 210, where it is determined whether to modify or send the messages. If the one or more rules determine the messages should be sent on, control is passed to step 220, where the messages are delivered to the appropriate module 130, 140. If the one or more rules determine the messages should be modified, control is passed on to step 230 where the messages may be modified one or more times. After modification of the messages one or more times, control is passed on to step 220, where the messages are delivered to the appropriate module 130, 140.

With reference back to FIG. 4, at step 240, the common language messages are translated into the destination language message. If the messages are destined for the industrial devices 11, the common-to-fieldbus module 140 translates the messages into messages of a fieldbus format. During this step, the common language messages are passed through and translated using a table of the database 60.

Similarly, messages destined for the automotive devices 13 are translated with the common-to-auto module 130 to an automotive format using a different table of the database 60.

At step 250, messages in the fieldbus format are delivered to the fieldbus module 50, and the transmitter 100 of the fieldbus module 50 delivers the fieldbus message to the transceiver 18. From there, the fieldbus message is delivered to the industrial devices 11 through the fieldbus network 12.

Messages of the automotive format are delivered to the automotive module 30, and the transmitter 80 of the automotive module 30 delivers the automotive message to the transceiver 16. From there, the automotive message is delivered to the automotive devices 13 through the CAN 14.

The self-contained, on-board, CAN-to-fieldbus converter 10 and method shown in the drawings and described in detail herein disclose arrangements of elements of particular construction and configuration for illustrating a preferred embodiment of structure and method of operation of the present invention. It is to be understood, however, that elements of different construction and configuration and other arrangements thereof, other that those illustrated and described may be employed for providing a self-contained, on-board, CAN-to-fieldbus converter 10 in accordance with the spirit of this invention, and such changes, alterations and modifications as would occur to those skilled in the art are considered to be within the scope of this invention as broadly defined in the appended claims.

What is claimed is:

1. A method of communicating a message between an automotive device of an automotive control area network and a non-automotive, industrial device of a non-automotive, fieldbus network, the method comprising:
    receiving a message of a source format from one of the automotive device of the automotive control area network and the non-automotive, industrial device of the non-automotive, fieldbus network;
    translating the message of the source format to a common language format;
    processing the message of a common language format via a set of stored, configurable rules;
    translating the processed message of a common language format to a destination message format;
    delivering the message in the appropriate destination format to one of the automotive device of the automotive control area network and the non-automotive, industrial device of the non-automotive, fieldbus network.

2. The method of claim 1, wherein the message includes more than one message.

3. The method of claim 1, wherein the automotive device of the automotive control area network includes multiple automotive devices of the automotive control area network.

4. The method of claim 1, wherein the non-automotive, industrial device of the non-automotive, fieldbus network includes multiple non-automotive, industrial devices of the non-automotive, fieldbus network.

5. The method of claim 1, wherein receiving a message of a source format is performed using an electronic transceiver, the electronic transceiver transmits the message to a microprocessor, and the microprocessor performs the translating and processing steps.

6. The method of claim 1, wherein the set of stored, configurable rules include instructions to at least one of send, discard, and modify the message.

7. The method of claim 1, further including a CAN-to-fieldbus converter and a protocol handler unique to a specific fieldbus protocol of the non-automotive, fieldbus network integrated into the CAN-to-fieldbus converter.

8. The method of claim 7, wherein the CAN-to-fieldbus converter includes a transceiver as a permanent component of the converter, and the transceiver performs as an electronic voltage and impedance interface.

9. The method of claim 8, wherein the transceiver is a modular component incorporated into the converter during manufacture of the converter.

10. The method of claim 8, further including a microprocessor, and power to the transceiver is turned on and off via a signal from the microprocessor.

11. The method of claim 1, wherein a microprocessor performs the translating steps using one or more tables.

12. The method of claim 11, further including the step of supplying the one or more tables with the automotive control area network.

13. The method of claim 11, further including the step of supplying the one or more tables with the non-automotive, fieldbus network.

14. The method of claim 1, further including the step of supplying the set of stored, configurable rules with the automotive control area network.

15. The method of claim 1, further including the step of supplying the set of stored, configurable rules with the non-automotive, fieldbus network.

16. The method of claim 1, wherein the receiving, translating, processing, and delivering steps are performed using a self-contained, on-board, CAN-to-fieldbus converter.

17. The method of claim 16, further including a waterproof enclosure containing the self-contained, on-board, CAN-to-fieldbus converter, and the enclosure is impervious to heat and vibration from an automotive environment.

18. The method of claim 16, wherein the self-contained, on-board, CAN-to-fieldbus converter includes a separate protocol handler and microprocessor, and the protocol handler is specific to the non-automotive, fieldbus network.

19. The method of claim 18, wherein the protocol handler is removable from the self-contained, on-board, CAN-to-fieldbus converter and is replaceable with another protocol handler specific to a different non-automotive, fieldbus network, and the method further includes removing the protocol handler from the self-contained, on-board, CAN-to-fieldbus converter, and replacing the protocol handler with another protocol handler specific to a different non-automotive, fieldbus network.

* * * * *